(12) United States Patent
Harris et al.

(10) Patent No.: US 11,034,134 B2
(45) Date of Patent: Jun. 15, 2021

(54) LAMINATED GLASS ARTICLE WITH DETERMINED MODULUS CONTRAST AND METHOD FOR FORMING THE SAME

(71) Applicant: Corning Incorporated, Corning, NY (US)

(72) Inventors: Jason Thomas Harris, Horseheads, NY (US); Guangli Hu, Berkeley Heights, NJ (US); Po-Jen Shih, Vancouver, WA (US); Bin Zhang, Penfield, NY (US); Chunfeng Zhou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 511 days.

(21) Appl. No.: 15/773,981

(22) PCT Filed: Nov. 4, 2016

(86) PCT No.: PCT/US2016/060501
§ 371 (c)(1),
(2) Date: May 4, 2018

(87) PCT Pub. No.: WO2017/079540
PCT Pub. Date: May 11, 2017

(65) Prior Publication Data
US 2018/0326704 A1 Nov. 15, 2018

Related U.S. Application Data

(60) Provisional application No. 62/251,466, filed on Nov. 5, 2015.

(51) Int. Cl.
*B32B 15/04* (2006.01)
*B32B 17/06* (2006.01)
(Continued)

(52) U.S. Cl.
CPC ............ *B32B 17/06* (2013.01); *B32B 37/144* (2013.01); *B32B 37/15* (2013.01); *C03C 3/091* (2013.01);
(Continued)

(58) Field of Classification Search
CPC ........ B32B 17/06; C03C 3/091; C03C 21/002
(Continued)

(56) References Cited

U.S. PATENT DOCUMENTS

| 4,214,886 A | 7/1980 | Shay et al. |
| 5,559,060 A | 9/1996 | Dumbaugh, Jr. et al. |

(Continued)

FOREIGN PATENT DOCUMENTS

| CN | 1340034 A | 3/2002 |
| TW | 201438894 A | 10/2014 |
| WO | 2015148618 A1 | 10/2015 |

OTHER PUBLICATIONS

English Translation of CN201680065038.4 Office Action dated Jul. 14, 2020; 6 Pages; Chinese Patent Office.
(Continued)

*Primary Examiner* — Lauren R Colgan

(57) ABSTRACT

A laminated glass article includes a glass core layer having a core modulus $E_{core}$ and a glass cladding layer adjacent to the core layer and having a cladding modulus $E_{clad}$. $E_{clad}$ can be at least 5 GPa less than $E_{core}$. A modulus ratio $E_{core}/E_{clad}$ can be at least 1.08. The cladding layer can have a compressive stress resulting from a coefficient of thermal expansion (CTE) contrast between the core layer and the cladding layer and/or subjecting the laminated glass article to an ion exchange treatment to form an ion exchanged region at an outer surface of the cladding layer.

18 Claims, 6 Drawing Sheets

(51) Int. Cl.
*C03C 3/091* (2006.01)
*C03C 17/02* (2006.01)
*C03C 21/00* (2006.01)
*B32B 37/15* (2006.01)
*B32B 37/14* (2006.01)
*C03B 17/02* (2006.01)
*C03B 17/06* (2006.01)

(52) U.S. Cl.
CPC ............ *C03C 17/02* (2013.01); *C03C 21/002* (2013.01); *B32B 2250/03* (2013.01); *B32B 2307/546* (2013.01); *B32B 2457/20* (2013.01); *B32B 2605/00* (2013.01); *C03B 17/02* (2013.01); *C03B 17/064* (2013.01)

(58) Field of Classification Search
USPC ......................................... 428/426, 428, 432
See application file for complete search history.

(56) References Cited

U.S. PATENT DOCUMENTS

| | | | |
|---|---|---|---|
| 6,627,569 | B1 | 9/2003 | Naumann et al. |
| 7,201,965 | B2 * | 4/2007 | Gulati ............... C03B 33/02 428/426 |
| 8,728,964 | B2 | 5/2014 | Hublikar et al. |
| 9,393,760 | B2 | 7/2016 | He et al. |
| 10,399,304 | B2 * | 9/2019 | Cleary ............... C03B 23/02 |
| 2006/0127679 | A1 | 6/2006 | Gulati et al. |
| 2011/0200804 | A1 | 8/2011 | Tomamoto et al. |
| 2011/0318555 | A1 * | 12/2011 | Bookbinder ......... C03C 3/085 428/213 |
| 2014/0138420 | A1 * | 5/2014 | Peng .............. C03B 33/0955 225/2 |
| 2014/0141217 | A1 * | 5/2014 | Gulati ............... C03B 17/02 428/212 |
| 2014/0242375 | A1 * | 8/2014 | Mauro .............. C03C 4/005 428/312.6 |
| 2014/0335331 | A1 | 11/2014 | Ellison et al. |
| 2015/0030827 | A1 * | 1/2015 | Gomez .............. C03C 21/002 428/212 |
| 2015/0037552 | A1 * | 2/2015 | Mauro .............. C03C 3/089 428/212 |
| 2015/0037553 | A1 | 2/2015 | Mauro |
| 2015/0051060 | A1 * | 2/2015 | Ellison .............. C03C 3/11 501/37 |
| 2015/0051061 | A1 | 2/2015 | Kiczenski et al. |
| 2015/0140299 | A1 * | 5/2015 | Ellison .............. B32B 17/06 428/212 |
| 2015/0157533 | A1 | 6/2015 | Demartino et al. |
| 2015/0314571 | A1 * | 11/2015 | Cites ............... C03C 4/18 428/215 |
| 2016/0347639 | A1 | 12/2016 | Hu et al. |
| 2017/0174564 | A1 * | 6/2017 | Cleary .............. C03B 17/02 |
| 2017/0297308 | A1 | 10/2017 | Golyatin et al. |

OTHER PUBLICATIONS

"Corning Gorilla® Glass Technical Materials", http://www.corning.com/docs/specialtymaterials/pisheets/PI2317.pdf.
Corning Gorilla Glass 2 Product Information; 2 Pages; Corning Incorporated Jan. 2012.
Corning Gorilla Glass 3 Product Information; 2 Pages; Corning Incorporated 2015.
Corning Gorilla Glass 4 Product Information; 2 Pages; Corning Incorporated Sep. 2015.
"Elastic Properties and Young Modulus for some Materials". The Engineering ToolBox. Retrieved Jan. 6, 2006.
Glover, D., Miller, D., Averis, D., Door, V. (2005) "The interactive whiteboard: a literature survey". Technology, Pedagogy and Education (14) 2: 155-170.
http://en.wikipedia.org/wiki/List_of_devices_with_Gorilla_Glass.
International Search Report and Written Opinion of the International Searching Authority; PCT/US2015/060501; dated Feb. 3, 2017; 16 Pages; European Patent Office.
Products With Gorilla Glass; Corning Incorporated; http://www.corning.com/gorillaglass/worldwide/en/products-with-gorilla.html; Downloaded Jul. 2018.
Thermal Properties of Corning Glasses; Corning Incorporated; 2 Pages; Aug. 2008.
Fields, J., Sands, A., (2010), "iPhone Reliability: in the days leading up to iPhone 4", SquareTrade Research, Jun. 22, 2010.

* cited by examiner

LAMINATED GLASS ARTICLE WITH DETERMINED MODULUS CONTRAST AND METHOD FOR FORMING THE SAME

This application claims the benefit of priority under 35 U.S.C. § 371 of International Application No. PCT/US2016/060501, filed on Nov. 4, 2016, which claims the benefit of priority to U.S. Provisional Application No. 62/251,466, filed Nov. 5, 2015, the content of each of which is incorporated herein by reference in its entirety.

BACKGROUND

1. Field

This disclosure relates to glass articles, and more particularly to laminated glass articles comprising a plurality of glass layers and methods for forming the same.

2. Technical Background

Glass articles can be used in a wide variety of products including, for example, auto-glazing, architectural panels, appliances, and cover glass (e.g., for touch-screen devices such as smartphones, tablets, laptop computers, and monitors). Relatively large flaws can be introduced into the surfaces of glass articles during use. For example, is has been observed that, when a smartphone is dropped onto a rough surface such as asphalt, the local indentation caused by contact with sharp features of the rough surface can cause flaws as deep as about 300 μm in the surface of the cover glass. Thus, it would be desirable to provide a glass article with improved resistance to breakage caused by deep flaws to enable improved mechanical reliability and drop performance.

SUMMARY

Disclosed herein are glass articles with determined modulus contrasts and methods for forming the same.

Disclosed herein is a laminated glass article comprising a glass core layer comprising a core modulus $E_{core}$ and a glass cladding layer adjacent to the core layer and comprising a cladding modulus $E_{clad}$ that is at least 5 GPa less than $E_{core}$.

Disclosed herein is a laminated glass article comprising a glass core layer comprising a core modulus $E_{core}$; a glass cladding layer adjacent to the core layer and comprising a cladding modulus $E_{clad}$; and a modulus ratio $E_{core}/E_{clad}$ of at least 1.08.

Disclosed herein is a method comprising contacting a molten core glass with a molten clad glass to form a laminated glass article comprising a glass core layer and a glass cladding layer. The glass core layer comprises a core modulus $E_{core}$, and the glass cladding layer comprises a cladding modulus $E_{clad}$. The laminated glass article comprises a modulus ratio $E_{core}/E_{clad}$ of at least 1.08.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claimed subject matter. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
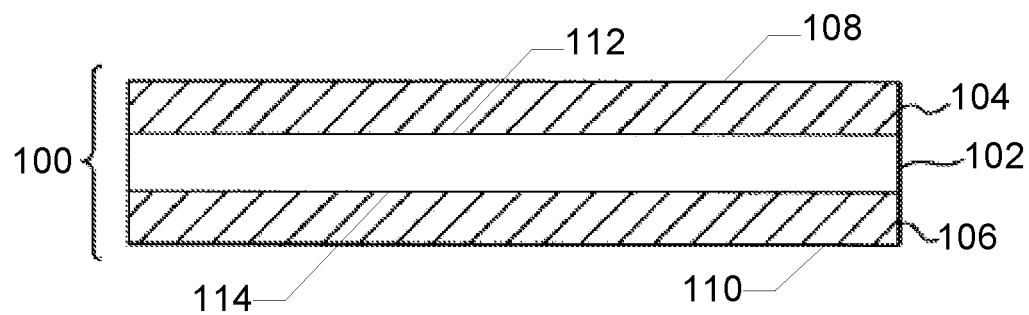
FIG. 1 is a cross-sectional view of one exemplary embodiment of a glass article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "modulus" refers to the Young's modulus of a given material or layer unless otherwise indicated. The Young's modulus can be determined, for example, using the procedure described in ASTM C623 "Standard Test Method for Young's Modulus, Shear Modulus, and Poisson's Ratio for Glass and Glass-Ceramics by Resonance."

As used herein, the term "average coefficient of thermal expansion," or "average CTE," refers to the average coefficient of linear thermal expansion of a given material or layer between 0° C. and 300° C. As used herein, the term "coefficient of thermal expansion," or "CTE," refers to the average coefficient of thermal expansion unless otherwise indicated. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

As used herein, the term "retained strength" refers to the strength of a glass article after formation of a flaw having a determined size or depth in the surface of the glass article. The strength is the flexural strength of the glass article determined using, for example, a ring-on-ring test method (e.g., as described in ASTM C1499-09 "Standard Test Method for Monotonic Equibiaxial Flexural Strength of Advanced Ceramics at Ambient Temperature"), an abraded ring-on-ring test method, a ball-on-ring test method, a three-point bend test method, a four-point bend test method, or another suitable method or technique. Retained strength (e.g., an estimated retained strength) can be estimated using a fracture mechanics simulation.

In various embodiments described herein, a glass article comprises a compressive stress or a tensile stress at a given depth within the glass article. Compressive stress and/or tensile stress values can be determined using, any suitable technique including, for example, a birefringence based measurement technique, a refracted near-field (RNF) technique, or a photoelastic measurement technique (e.g., using a polarimeter). Exemplary standards for stress measurement include, for example, ASTM C1422/C1422M-10 "Standard Specification for Chemically Strengthened Flat Glass" and ASTM F218 "Standard Method for Analyzing Stress in Glass."

In various embodiments, a laminated glass article comprises a core layer and at least one cladding layer adjacent to the core layer. The core layer and/or the cladding layer are glass layers comprising a glass material, a ceramic material, a glass-ceramic material, or a combination thereof. In some embodiments, the core layer and/or the cladding layer are transparent glass layers. For example, the core layer and/or the cladding layer transmit at least about 80% of visible light in a wavelength range of about 400 nm to about 700 nm. The core layer has a core modulus $E_{core}$, and the cladding layer has a cladding modulus $E_{clad}$. For example, the core layer is formed from a first glass composition with core modulus $E_{core}$ and the cladding layer is formed from a second glass composition with cladding modulus $E_{clad}$. $E_{clad}$ is less than $E_{core}$. For example, $E_{clad}$ is at least 5 GPa less than $E_{core}$, and/or a modulus ratio $E_{core}/E_{clad}$ is at least 1.08. Such a modulus contrast between the core layer and the cladding layer can enhance the retained strength of the laminated glass article as described herein.

FIG. 1 is a cross-sectional view of one exemplary embodiment of a laminated glass article 100. In some embodiments, glass article 100 comprises a laminated sheet comprising a plurality of glass layers. The laminated sheet can be substantially planar as shown in FIG. 1 or non-planar. Glass article 100 comprises a core layer 102 disposed between a first cladding layer 104 and a second cladding layer 106. In some embodiments, first cladding layer 104 and second cladding layer 106 are exterior layers as shown in FIG. 1. For example, an outer surface 108 of first cladding layer 104 serves as an outer surface of glass article 100 and/or an outer surface 110 of second cladding layer 106 serves as an outer surface of the glass article. In other embodiments, the first cladding layer and/or the second cladding layer are intermediate layers disposed between the core layer and an exterior layer.

Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. In such embodiments, an interface 112 between first cladding layer 104 and core layer 102 and/or an interface 114 between second cladding layer 106 and core layer 102 are free of any bonding material such as, for example, an adhesive, a coating layer, or any non-glass material added or configured to adhere the respective cladding layers to the core layer. Thus, first cladding layer 104 and/or second cladding layer 106 are fused directly to core layer 102 or are directly adjacent to core layer 102. In some embodiments, the glass article comprises one or more intermediate layers disposed between the core layer and the first cladding layer and/or between the core layer and the second cladding layer. For example, the intermediate layers comprise intermediate glass layers and/or diffusion layers formed at the interface of the core layer and the cladding layer. The diffusion layer can comprise a blended region comprising components of each layer adjacent to the diffusion layer (e.g., a blended region between two directly adjacent glass layers). In some embodiments, glass article 100 comprises a glass-glass laminate (e.g., an in situ fused multilayer glass-glass laminate) in which the interfaces between directly adjacent glass layers are glass-glass interfaces.

In some embodiments, core layer 102 comprises a first glass composition, and first and/or second cladding layers 104 and 106 comprise a second glass composition that is different than the first glass composition. The first glass composition and the second glass composition are different from each other prior to subjecting the glass article to any type of chemical strengthening treatment as described herein. For example, in the embodiment shown in FIG. 1, core layer 102 comprises the first glass composition, and each of first cladding layer 104 and second cladding layer 106 comprises the second glass composition. In other embodiments, the first cladding layer comprises the second glass composition, and the second cladding layer comprises a third glass composition that is different than the first glass composition and/or the second glass composition.

Figure 2:
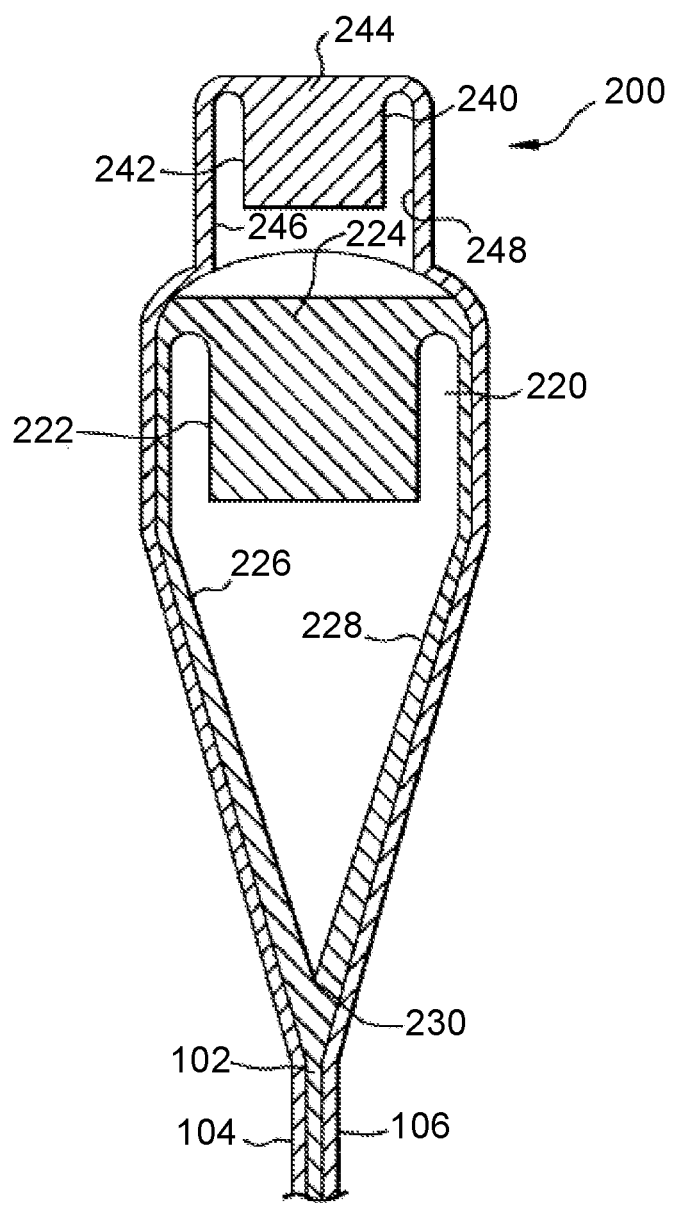
FIG. 2 is a cross-sectional view of one exemplary embodiment of an overflow distributor that can be used to form a glass article.

The glass article can be formed using a suitable process such as, for example, a fusion draw, down draw, slot draw, up draw, or float process. In some embodiments, the glass article is formed using a fusion draw process. FIG. 2 is a cross-sectional view of one exemplary embodiment of an overflow distributor 200 that can be used to form a glass article such as, for example, glass article 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor. Lower overflow distributor 220 comprises a trough 222. A first glass composition 224 is melted and fed into trough 222 in a viscous state. First glass composition 224 forms core layer 102 of glass article 100 as further described below. Upper overflow distributor 240 comprises a trough 242. A second glass composition 244 is melted and fed into trough 242 in a viscous state. Second glass composition 244 forms first and second cladding layers 104 and 106 of glass article 100 as further described below.

First glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form core layer 102 of glass article 100.

Second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms first and second cladding layers 104 and 106 of glass article 100.

In some embodiments, first glass composition 224 of core layer 102 in the viscous state is contacted with second glass composition 244 of first and second cladding layers 104 and 106 in the viscous state to form the laminated sheet. In some of such embodiments, the laminated sheet is part of a glass ribbon traveling away from draw line 230 of lower overflow distributor 220 as shown in FIG. 2. The glass ribbon can be drawn away from lower overflow distributor 220 by a suitable means including, for example, gravity and/or pulling rollers. The glass ribbon cools as it travels away from lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, glass article 100 comprises the laminated sheet as shown in FIG. 1. In other embodiments, the laminated sheet can be processed further (e.g., by cutting or molding) to form glass article 100.

Although glass article 100 shown in FIG. 1 comprises three layers, other embodiments are included in this disclosure. In other embodiments, a glass article can have a determined number of layers, such as two, four, or more layers. For example, a glass article comprising two layers can be formed using two overflow distributors positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A glass article comprising four or more layers can be formed using additional overflow distributors and/or using overflow distributors with divided troughs. Thus, a glass article having a determined number of layers can be formed by modifying the overflow distributor accordingly.

Although glass article 100 shown in FIG. 1 comprises a laminated sheet, other embodiments are included in this disclosure. In other embodiments, a glass article comprises a laminated tube comprising multiple tubular layers (e.g., formed by one or more annular orifices). For example, a partial cross-section of the laminated tube comprises a laminate structure similar to that shown in FIG. 1. In other embodiments, a glass article comprises a shaped glass article (e.g., formed by shaping or molding a laminated sheet).

A thickness of glass article 100 can be measured as the distance between opposing outer surfaces (e.g., outer surfaces 108 and 110) of the glass article. In some embodiments, glass article 100 comprises a thickness of at least about 0.05 mm, at least about 0.1 mm, at least about 0.2 mm, or at least about 0.3 mm. Additionally, or alternatively, glass article 100 comprises a thickness of at most about 2 mm, at most about 1.5 mm, at most about 1 mm, at most about 0.7 mm, or at most about 0.5 mm. In some embodiments, a ratio of a thickness of core layer 102 to a thickness of glass article 100 is at least about 0.7, at least about 0.8, at least about 0.85, at least about 0.9, or at least about 0.95. Additionally, or alternatively, the ratio of the thickness of core layer 102 to the thickness of glass article 100 is at most about 0.95, at most about 0.93, at most about 0.9, at most about 0.87, or at most about 0.85. In some embodiments, a thickness of each of first cladding layer 104 and second cladding layer 106 is from about 0.01 mm to about 0.3 mm.

In some embodiments, the first glass composition of core layer 102 and/or the second glass composition of first cladding layer 104 and/or second cladding layer 106 comprise a liquidus viscosity of at least about 30 kiloPoise (kP), at least about 50 kP, at least about 100 kP, at least about 200 kP, or at least about 300 kP. In some embodiments, the first glass composition and/or the second glass composition comprise a liquidus viscosity suitable for forming glass article 100 using a fusion draw process as described herein. For example, the first glass composition of core layer 102 comprises a liquidus viscosity of at least about 100 kP, at least about 200 kP, or at least about 300 kP. Additionally, or alternatively, the first glass composition comprises a liquidus viscosity of at most about 3000 kP, at most about 2500 kP, at most about 1000 kP, or at most about 800 kP. Additionally, or alternatively, the second glass composition of first cladding layer 104 and/or second cladding layer 106 comprises a liquidus viscosity of at least about 50 kP, at least about 100 kP, or at least about 200 kP. Additionally, or alternatively, the second glass composition comprises a liquidus viscosity of at most about 3000 kP, at most about 2500 kP, at most about 1000 kP, or at most about 800 kP. The first glass composition can aid in carrying the second glass composition over the overflow distributor to form the second layer. Thus, the second glass composition can comprise a liquidus viscosity that is lower than generally considered suitable for forming a single layer sheet using a fusion draw process.

In some embodiments, glass article 100 comprises a modulus contrast. The modulus contrast comprises a difference in modulus, or a modulus mismatch, between core layer 102 and first cladding layer 104 and/or second cladding layer 106. In some embodiments, the cladding modulus $E_{clad}$ is less than the core modulus $E_{core}$. For example, a modulus difference $E_{core}-E_{clad}$ is at least 5 GPa, at least 6 GPa, at least 7 GPa, at least 8 GPa, at least 9 GPa, at least 10 GPa, at least 11 GPa, at least 12 GPa, at least 13 GPa, at least 14 GPa, at least 15 GPa, at least 20 GPa, at least 25 GPa, or at least 30 GPa. Additionally, or alternatively, the modulus difference $E_{core}-E_{clad}$ is at most 50 GPa, at most 40 GPa, at most 30 GPa, at most 20 GPa, or at most 10 GPa. Additionally, or alternatively, a modulus ratio $E_{core}/E_{clad}$ is at least 1.08, at least 1.09, at least 1.10, at least 1.11, at least 1.12, at least 1.13, at least 1.14, at least 1.15, at least 1.16, at least 1.17, at least 1.18, at least 1.19, at least 1.20, at least 1.21, at least 1.22, at least 1.23, at least 1.24, at least 1.25, at least 1.3, at least 1.35, at least 1.4, at least 1.45, at least 1.5, at least 1.55, at least 1.6, at least 1.65, or at least 1.7. Additionally, or alternatively, the modulus ratio $E_{core}/E_{clad}$ is at most 1.8, at most 1.7, at most 1.6, at most 1.5, at most 1.4, at most 1.3, at most 1.2, or at most 1.15. Such a modulus contrast between the core layer and the cladding layers can enhance the retained strength of the laminated glass article as described herein.

In some embodiments, glass article 100 with a modulus contrast is mechanically strengthened. For example, the second glass composition of first cladding layer 104 and/or second cladding layer 106 comprises a different CTE than the first glass composition of core layer 102. Such a CTE contrast between directly adjacent layers of glass article 100 can result in mechanical strengthening of the glass article. For example, first and second cladding layers 104 and 106 are formed from a glass composition (e.g., the second glass composition) having a lower CTE than a glass composition (e.g., the first glass composition) of core layer 102. Thus, glass article 100 comprises a CTE contrast $CTE_{core}-CTE_{clad}$ that is greater than zero. The relatively lower CTE of first and second cladding layers 104 and 106 compared to core layer 102 results in formation of compressive stress in the cladding layers and tensile stress in the core layer upon cooling of glass article 100. Thus, the difference between the CTE $CTE_{core}$ of core layer 102 and the CTE $CTE_{clad}$ of first cladding layer 104 and/or second cladding layer 106, or CTE contrast $CTE_{core}-CTE_{clad}$, produces compressive stress in the cladding layers, whereby glass article 100 is mechanically strengthened. In embodiments in which the cladding layers are exterior layers of the glass article, such compressive stress in the cladding layers can be beneficial for the strength of the glass article by resisting propagation of flaws present at the outer surface of the glass article.

In some embodiments, first and second cladding layers 104 and 106 are formed from a glass composition (e.g., the second glass composition) having a higher CTE than a glass composition (e.g., the first glass composition) of core layer 102. Thus, glass article 100 comprises a CTE contrast $CTE_{core}-CTE_{clad}$ that is less than zero. The relatively higher CTE of first and second cladding layers 104 and 106 compared to core layer 102 results in formation of tensile stress in the cladding layers and compressive stress in the core layer upon cooling of glass article 100. In embodiments in which the cladding layers are exterior layers of the glass article, such tensile stress in the cladding layers can be detrimental to the strength of the glass article by allowing propagation of flaws present at the outer surface of the glass article. However, a glass article with cladding layers in tension can be subjected to an ion exchange treatment to form a layer of compressive stress near an outer surface of the glass article as described herein. Such a compressive layer or ion exchanged region can be beneficial for the strength of the glass article by resisting propagation of flaws present at the outer surface of the glass article.

In various embodiments, each of the first and second cladding layers, independently, can have a higher CTE, a lower CTE, or substantially the same CTE as the core layer.

In some embodiments, the CTE of core layer 102 and the CTE of first cladding layer 104 and/or second cladding layer 106 differ by at least about $1 \times 10^{-7}$ °C.$^{-1}$, at least about $2 \times 10^{-7}$ °C.$^{-1}$, at least about $3 \times 10^{-7}$ °C.$^{-1}$, at least about $4 \times 10^{-7}$ °C.$^{-1}$, at least about $5 \times 10^{-7}$ °C.$^{-1}$, at least about $10 \times 10^{-7}$ °C.$^{-1}$, at least about $15 \times 10^{-7}$ °C.$^{-1}$, at least about $20 \times 10^{-7}$ °C.$^{-1}$, at least about $25 \times 10^{-7}$ °C.$^{-1}$, or at least about $30 \times 10^{-7}$ °C.$^{-1}$. Additionally, or alternatively, the CTE of core layer 102 and the CTE of first cladding layer 104 and/or second cladding layer 106 differ by at most about $100 \times 10^{-7}$ °C.$^{-1}$, at most about $75 \times 10^{-7}$ °C.$^{-1}$, at most about $50 \times 10^{-7}$ °C.$^{-1}$, at most about $40 \times 10^{-7}$ °C.$^{-1}$, at most about $30 \times 10^{-7}$ °C.$^{-1}$, at most about $20 \times 10^{-7}$ °C.$^{-1}$, at most about $10 \times 10^{-7}$ °C.$^{-1}$, at most about $9 \times 10^{-7}$ °C.$^{-1}$, at most about $8 \times 10^{-7}$ °C.$^{-1}$, at most about $7 \times 10^{-7}$ °C.$^{-1}$, at most about $6 \times 10^{-7}$ °C.$^{-1}$, or at most about $5 \times 10^{-7}$ °C.$^{-1}$. For example, in some embodiments, the CTE of core layer 102 and the CTE of first cladding layer 104 and/or second cladding layer 106 differ by about $1 \times 10^{-7}$ °C.$^{-1}$ to about $10 \times 10^{-7}$ °C.$^{-1}$ or about $1 \times 10^{-7}$ °C.$^{-1}$ to about $5 \times 10^{7}$ °C.$^{-1}$. In some embodiments, the second glass composition of first cladding layer and/or second cladding layer comprises a CTE of at most about $90 \times 10^{-7}$ °C.$^{-1}$, at most about $89 \times 10^{-7}$ °C.$^{-1}$, at most about $88 \times 10^{-7}$ °C.$^{-1}$, at most about $80 \times 10^{-7}$ °C.$^{-1}$, at most about $70 \times 10^{-7}$ °C.$^{-1}$, at most about $60 \times 10^{-7}$ °C.$^{-1}$, at most about $50 \times 10^{-7}$ °C.$^{-1}$, at most about $40 \times 10^{-7}$ °C.$^{-1}$, or at most about $35 \times 10^{-7}$ °C.$^{-1}$. Additionally, or alternatively, the second glass composition of first cladding layer 104 and/or second cladding layer 106 comprises a CTE of at least about $10 \times 10^{-7}$ °C.$^{-1}$, at least about $15 \times 10^{-7}$ °C.$^{-1}$, at least about $25 \times 10^{-7}$ °C.$^{-1}$, at least about $30 \times 10^{-7}$ °C.$^{-1}$, at least about $40 \times 10^{-7}$ °C.$^{-1}$, at least about $50 \times 10^{-7}$ °C.$^{-1}$, at least about $60 \times 10^{-7}$ °C.$^{-1}$, at least about $70 \times 10^{-7}$ °C.$^{-1}$, at least about $80 \times 10^{-7}$ °C.$^{-1}$, or at least about $85 \times 10^{-7}$ °C.$^{-1}$. Additionally, or alternatively, the first glass composition of core layer 102 comprises a CTE of at least about $40 \times 10^{-7}$ °C.$^{-1}$, at least about $50 \times 10^{-7}$ °C.$^{-1}$, at least about $55 \times 10^{-7}$ °C.$^{-1}$, at least about $65 \times 10^{-7}$ °C.$^{-1}$, at least about $70 \times 10^{-7}$ °C.$^{-1}$, at least about $80 \times 10^{-7}$ °C.$^{-1}$, or at least about $90 \times 10^{7}$ °C.$^{-1}$. Additionally, or alternatively, the first glass composition of core layer 102 comprises a CTE of at most about $120 \times 10^{-7}$ °C.$^{-1}$, at most about $110 \times 10^{-7}$ °C.$^{-1}$, at most about $100 \times 10^{-7}$ °C.$^{-1}$, at most about $90 \times 10^{-7}$ °C.$^{-1}$, at most about $75 \times 10^{-7}$ °C.$^{-1}$, or at most about $70 \times 10^{-7}$ °C.$^{-1}$.

The compressive and tensile stresses that result from the CTE contrast of the glass article are related to the elastic moduli of the various layers of the glass article. For example, glass article 100 can comprise a CTE contrast $CTE_{core}-CTE_{clad}$ that is greater than zero such that the cladding layers 104 and 106 are in compression and the core layer 102 is in tension as described herein. In such embodiments, as the cladding modulus $E_{clad}$ decreases, the compressive stress in cladding layers 104 and 106 also decreases. To maintain the same compressive stress in cladding layers 104 and 106, the CTE contrast $CTE_{core}-CTE_{clad}$ can be increased in proportion to the decrease in cladding modulus $E_{clad}$ or the increase in modulus contrast $E_{core}-E_{clad}$.

Figure 3:
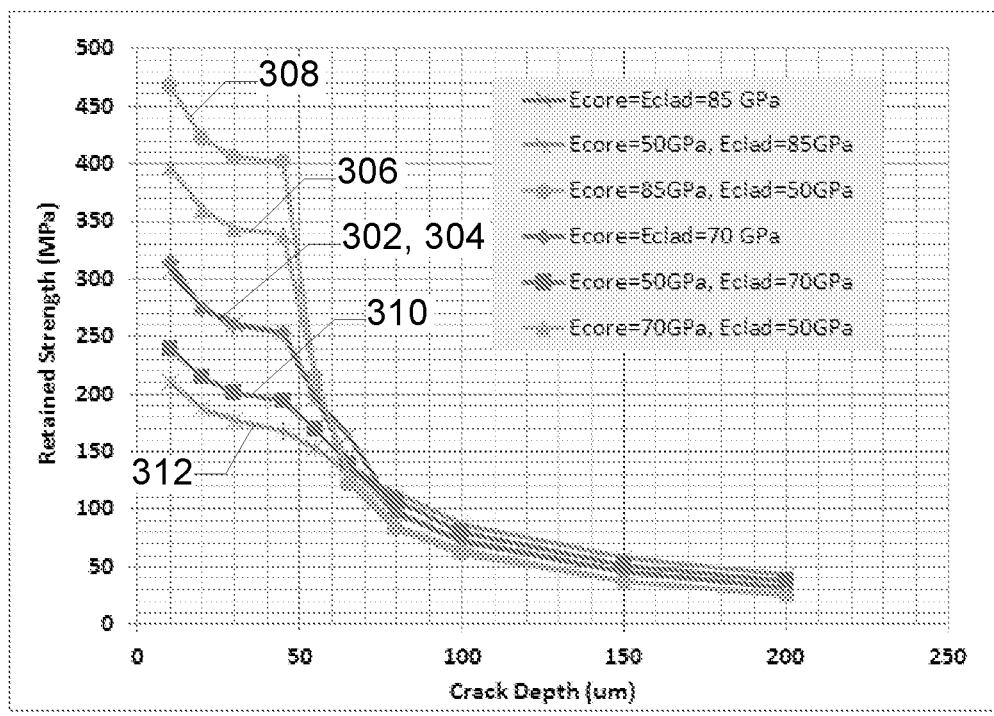
FIG. 3 is a graphical illustration comparing retained strength profiles of exemplary glass articles with different modulus contrasts.

FIG. 3 is a graphical illustration comparing exemplary retained strength profiles of glass articles with different modulus contrasts. The retained strength of a glass article is a measure of the strength of the glass article when a flaw of certain depth is introduced into the glass article. Thus, the retained strength is a function of flaw depth. A stress intensity factor $K_I$ takes into account both stress and flaw depth and is represented by the equation $$K_I = Y\sigma\sqrt{a}$$

where Y is the flaw or crack shape parameter, which is about constant for a glass surface, σ is stress, and a is flaw size or depth. For glasses, a critical stress intensity factor $K_{IC}$, or the stress intensity factor at which a flaw will propagate within the glass article, is rather narrow. For example, the critical stress intensity factor $K_{IC}$ ranges from 0.7 to 0.8. Retained strength can be approximated as the stress σ at which the stress intensity factor $K_I$ is equal to the critical stress intensity factor $K_{IC}$. Compressive stress at a surface of a glass article can enhance the retained strength by protecting the glass surface from flaws or cracks (e.g., by preventing flaws present at the surface from propagating deeper into the glass article and causing the glass article to fracture). Retained strength can be calculated using fracture mechanics simulations. The stress intensity factors are calculated using a finite element analysis (FEA) model comprising two regions: the core and clad, the elastic moduli of which can be varied independently. A crack is inserted into the model and the stress intensity factor $K_I$ is calculated along contour integrals. The stress intensity factor $K_I$ is calculated as a function of load and the load when $K_I = K_{IC}$ is the retained strength. This calculation is repeated for different flaw length and modulus contrast values.

The retained strength profiles shown in FIG. 3 are represented by the retained strength of the glass article as a function flaw size. The flaw size, given as the distance from an outer surface of the glass article, or the depth, to which the flaw extends, is plotted on the x-axis, and the retained strength is plotted on the y-axis. The retained strength profiles were generated using fracture mechanics simulations. The simulated glass article was a laminated glass sheet with the configuration shown in FIG. 1. The glass article had a thickness of 1 mm, the core layer had a thickness of 0.9 mm, and each cladding layer had a thickness of 0.05 mm. The glass article was mechanically strengthened by CTE contrast between the core layer and the cladding layers, whereby the cladding layers were under a compressive stress of 190 MPa, and the core layer was under a tensile stress of 21 MPa. The stresses were substantially constant throughout the thicknesses of the respective layers. The simulated glass article resulting in retained strength profile 302 had a core modulus $E_{core}$ of 70 GPa and a cladding modulus $E_{clad}$ of 70 GPa, for a modulus contrast $E_{core}$-$E_{clad}$ of 0 GPa (i.e., no modulus contrast). The simulated glass article resulting in retained strength profile 304 had a core modulus $E_{core}$ of 85 GPa and a cladding modulus $E_{clad}$ of 85 GPa, for a modulus contrast $E_{core}$-$E_{clad}$ of 0 GPa (i.e., no modulus contrast). The simulated glass article resulting in retained strength profile 306 had a core modulus $E_{core}$ of 70 GPa and a cladding modulus $E_{clad}$ of 50 GPa, for a modulus contrast $E_{core}$-$E_{clad}$ of 20 GPa and a modulus ratio $E_{core}/E_{clad}$ of 1.4. The simulated glass article resulting in retained strength profile 308 had a core modulus $E_{core}$ of 85 GPa and a cladding modulus $E_{clad}$ of 50 GPa, for a modulus contrast $E_{core}$-$E_{clad}$ of 35 GPa and a modulus ratio $E_{core}/E_{clad}$ of 1.7. The simulated glass article resulting in retained strength profile 310 had a core modulus $E_{core}$ of 50 GPa and a cladding modulus $E_{clad}$ of 70 GPa, for a modulus contrast $E_{core}$-$E_{clad}$ of −20 GPa and a modulus ratio $E_{core}/E_{clad}$ of 0.71. The simulated glass article resulting in retained strength profile 312 had a core modulus $E_{core}$ of 50 GPa and a cladding modulus $E_{clad}$ of 85 GPa, for a modulus contrast $E_{core}$-$E_{clad}$ of −35 GPa and a modulus ratio $E_{core}/E_{clad}$ of 0.59. Retained strength profiles 302 and 304 represent control examples in which the glass article is free of a modulus contrast (i.e., $E_{core}=E_{clad}$). Retained strength profiles 306 and 308 represent exemplary embodiments in which $E_{core}>E_{clad}$. Retained strength profiles 310 and 312 represent comparative examples in which $E_{core}<E_{clad}$.

As shown in FIG. 3, retained strength profile 306 has a retained strength of about 395 MPa at a flaw depth of 10 μm compared to retained strength profiles 302 and 304 that have a retained strength of about 315 MPa at a flaw depth of 10 μm. Thus, increasing the modulus contrast from 0 GPa to 20 GPa increases the retained strength of the glass article by about 25%. Also as shown in FIG. 3, retained strength profile 308 has a retained strength of about 470 MPa at a flaw depth of 10 μm compared to retained strength profiles 302 and 304 that have a retained strength of about 315 MPa at a flaw depth of 10 μm. Thus, increasing the modulus contrast from 0 GPa to 35 GPa increases the retained strength of the glass article by about 49%. The increases in retained strength result from the increased modulus contrast, without any change in the compressive stress in the cladding layers or the tensile stress in the core layer. Thus, the modulus contrast can enable increased retained strength for the same degree of mechanical strengthening (e.g., the same CTE contrast and thicknesses).

FIG. 3 illustrates that a laminated glass article with a relatively soft, or low modulus, clad and a relatively hard, or high modulus, core can exhibit improved retained strength compared to a laminated glass article without such a modulus contrast. Without wishing to be bound by any theory, it is believed that when a tensile stress is applied to a laminated glass article with soft clad and hard core, the cladding layer will have a smaller stress than the core layer due to the strain continuity of elastic materials. Thus, to reach the same stress intensity factor at the flaw tip would require applying a higher tensile stress. As the critical stress intensity factor values for glass compositions generally fall within a narrow range of 0.7 to 0.8, the retained strength of the laminated glass article with soft clad and hard core is larger than for the baseline case (e.g., $E_{core}=E_{clad}$). As a flaw in the soft cladding layer propagates to the interface between the cladding layer and core layer, the tip of the flaw has a lower stress intensity factor with softer clad. Thus, it is more difficult for the flaw to propagate into the core layer of the glass laminate with the soft clad compared to a glass laminate with a harder clad. The core layer with higher modulus creates a resistance for flaw propagation. If the glass composition of the core layer has a higher fracture toughness, with the same stress intensity factor at the clad/core interface, it will be even harder for the flaw to propagate into the core layer, and the resistance to flaw propagation will be further strengthened. Fracture toughness can be determined, for example, using the procedure described in ASTM C1421 "Standard Test Methods for Determination of Fracture Toughness of Advanced Ceramics at Ambient Temperature."

As shown in FIG. 3, retained strength profile 310 has a retained strength of about 240 MPa at a flaw depth of 10 μm compared to retained strength profiles 302 and 304 that have a retained strength of about 315 MPa at a flaw depth of 10 μm. Thus, decreasing the modulus contrast from 0 GPa to −20 GPa decreases the retained strength of the glass article by about 24%. Also as shown in FIG. 3, retained strength profile 312 has a retained strength of about 210 MPa at a flaw depth of 10 μm compared to retained strength profiles 302 and 304 that have a retained strength of about 315 MPa at a flaw depth of 10 μm. Thus, decreasing the modulus contrast from 0 GPa to −35 GPa decreases the retained strength of the glass article by about 33%. The decreases in retained strength result from the decreased modulus contrast, without any change in the compressive stress in the cladding layers or the tensile stress in the core layer.

Figure 4:
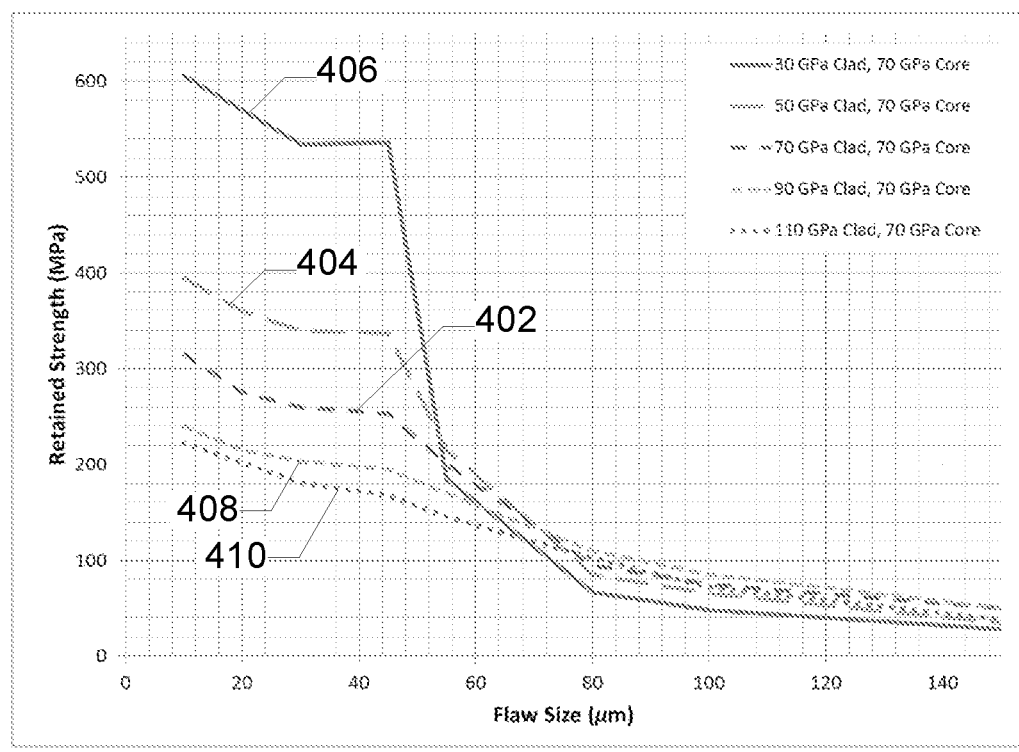
FIG. 4 is a graphical illustration comparing retained strength profiles of exemplary glass articles with different modulus contrasts.

FIG. 4 is a graphical illustration comparing exemplary retained strength profiles of glass articles with different modulus contrasts. The retained strength profiles shown in FIG. 4 were generated using fracture mechanics simulations. The simulated glass article was a laminated glass sheet as described with reference to FIG. 3. To generate the retained strength profiles shown in FIG. 4, the cladding modulus $E_{clad}$ was varied from 30 GPa to 110 GPa while holding the core modulus $E_{core}$ constant at 70 GPa. The simulated glass article resulting in retained strength profile 402 had a cladding modulus $E_{clad}$ of 70 GPa, for a modulus contrast $E_{core}$-$E_{clad}$ of 0 GPa (i.e., no modulus contrast). The simulated glass article resulting in retained strength profile 404 had a cladding modulus $E_{clad}$ of 50 GPa, for a modulus contrast $E_{core}$-$E_{clad}$ of 20 GPa and a modulus ratio $E_{core}/E_{clad}$ of 1.4. The simulated glass article resulting in retained strength profile 406 had a cladding modulus $E_{clad}$ of 30 GPa, for a modulus contrast $E_{core}$-$E_{clad}$ of 40 GPa and a modulus ratio $E_{core}/E_{clad}$ of 1.75. The simulated glass article resulting in retained strength profile 408 had a cladding modulus $E_{clad}$ of 90 GPa, for a modulus contrast $E_{core}$-$E_{clad}$ of −20 GPa and a modulus ratio $E_{core}/E_{clad}$ of 0.78. The simulated glass article resulting in retained strength profile 310 had a cladding modulus $E_{clad}$ of 110 GPa, for a modulus contrast $E_{core}$-$E_{clad}$ of −40 GPa and a modulus ratio $E_{core}/E_{clad}$ of 0.64. Retained strength profile 402 represents a control example in which the glass article is free of a modulus contrast (i.e., $E_{core}=E_{clad}$). Retained strength profiles 404 and 406 represent exemplary embodiments in which $E_{core} > E_{clad}$. Retained strength profiles 408 and 410 represent comparative examples in which $E_{core} < E_{clad}$.

As shown in FIG. 4, retained strength profile 404 has a retained strength of about 398 MPa at a flaw depth of 10 μm compared to retained strength profile 402 that has a retained strength of about 317 MPa at a flaw depth of 10 μm. Thus, increasing the modulus contrast from 0 GPa to 20 GPa increases the retained strength of the glass article by about 26%. Also as shown in FIG. 4, retained strength profile 406 has a retained strength of about 603 MPa at a flaw depth of 10 μm compared to retained strength profile 402 that has a retained strength of about 317 MPa at a flaw depth of 10 μm. Thus, increasing the modulus contrast from 0 GPa to 40 GPa increases the retained strength of the glass article by about 90%. The increases in retained strength result from the increased modulus contrast, without any change in the compressive stress in the cladding layers or the tensile stress in the core layer. Thus, the modulus contrast can enable increased retained strength for the same degree of mechanical strengthening (e.g., the same CTE contrast and thicknesses).

As shown in FIG. 4, retained strength profile 408 has a retained strength of about 220 MPa at a flaw depth of 10 μm compared to retained strength profile 402 that has a retained strength of about 317 MPa at a flaw depth of 10 μm. Thus, decreasing the modulus contrast from 0 GPa to −20 GPa decreases the retained strength of the glass article by about 31%. Also as shown in FIG. 4, retained strength profile 410 has a retained strength of about 211 MPa at a flaw depth of 10 μm compared to retained strength profile 402 that has a retained strength of about 317 MPa at a flaw depth of 10 μm. Thus, decreasing the modulus contrast from 0 GPa to −40 GPa decreases the retained strength of the glass article by about 33%. The decreases in retained strength result from the decreased modulus contrast, without any change in the compressive stress in the cladding layers or the tensile stress in the core layer.

FIGS. 3-4 illustrate that a laminated glass article with relatively low modulus cladding layers and a relatively high modulus core layer can have increased retained strength for shallow flaw depths compared to a laminated glass article without a modulus contrast between the cladding layers and the core layer. The increase in retained strength is proportionally greater for large modulus contrast compared to small modulus contrast. Thus, the effect of modulus contrast on retained strength is non-linear, and relatively large modulus contrast may be beneficial for providing increased retained strength for shallow flaw depths.

However, FIGS. 3-4 also illustrate that a modulus contrast can lead to reduced retained strength for deep flaw depths compared to a laminated glass article without a modulus contrast. For example, retained strength profiles 306 and 308 have lower retained strength than retained strength profiles 302 and 304 at flaw depths greater than about 60 μm. Also, for example, retained strength profile 404 has a lower retained strength than retained strength profile 402 at flaw depths greater than about 72 μm, and retained strength profile 406 has a lower retained strength than retained strength profile 402 at flaw depths greater than about 54 μm. Thus, the increase in retained strength for shallow flaw depths resulting from larger modulus contrast is accompanied by a decrease in retained strength for deep flaw depths.

In some embodiments, the glass article with the modulus contrast comprises an estimated retained strength with a 10 μm deep flaw formed therein of at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, or at least about 90% greater than a reference glass article that is free of the modulus contrast. The estimated retained strength comprises the retained strength determined using a fracture mechanics simulation. The estimated retained strength is the apparent stress at which the glass will fail due to the assumed flaw and can be calculated using beam theory. A beam theory model predicts the load P at failure of a rectangular beam with a height d, a width b, and a length $L_s$. The beam is supported from the bottom of the beam at each end, and the load P is applied to the top of the beam at a distance L inboard from each end of the beam. The load P at failure can be converted to an estimated retained strength S using the following equation:

$$S = \frac{6PL}{bd^2}.$$

The reference glass article is identical to (e.g., comprises the same thicknesses and CTE contrast as) the glass article except for the modulus contrast. The reference glass article comprises a reference core modulus and a reference cladding modulus, and the reference core modulus is equal to the reference cladding modulus.

Figure 5:
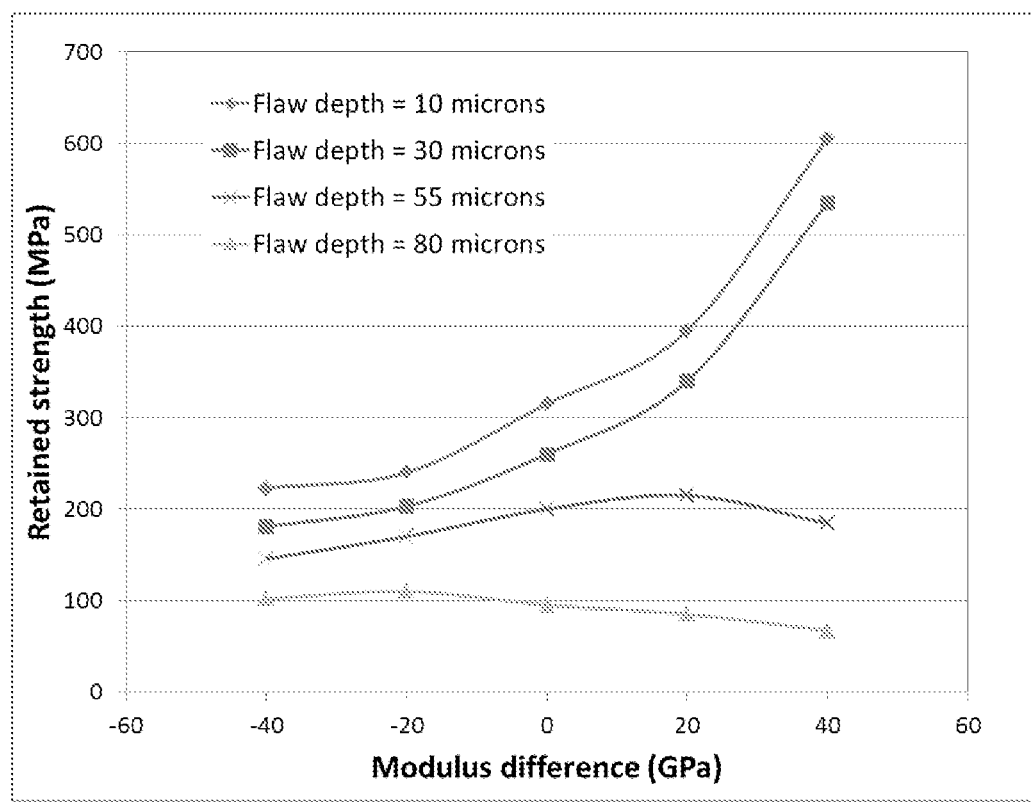
FIG. 5 is a graphical illustration comparing the retained strength of exemplary glass articles as a function of modulus contrast for several different flaw depths.

FIG. 5 is a graphical illustration comparing retained strengths of exemplary glass articles as a function of modulus contrast for several different flaw depths. The curves in FIG. 5 were generated using the data from the simulations described with reference to FIGS. 3-4. As shown in FIG. 5, the retained strength of the glass article increases with increasing modulus contrast (e.g., with increasing core modulus $E_{core}$ and/or decreasing cladding modulus $E_{clad}$) for flaw depths of 10 μm and 30 μm. However, for a flaw depth of 55 μm, the retained strength of the glass article initially increases with increasing modulus contrast up to a modulus contrast of 20 GPa and then decreases with increasing modulus contrast at modulus contrasts greater than 20 GPa. For a flaw depth of 80 μm, the retained strength of the glass article initially increases with increasing modulus contrast up to a modulus contrast of −20 GPa and then decreases with increasing modulus contrast at modulus contrasts greater than −20 GPa.

As shown in FIG. 5, increasing the modulus contrast can increase the retained strength of the glass article at flaw depths less than the thickness of the cladding layer. Thus, increasing the modulus contrast can help to improve the resistance of the glass article to breakage caused by shallow flaws. However, increasing the modulus contrast can decrease the retained strength of the glass article at flaw depths greater than the thickness of the cladding layer (e.g., at flaw depths of at least 10% greater, at least 20% greater, at least 30% greater, at least 40% greater, at least 50% greater, or at least 60% greater than the thickness of the cladding layer). Thus, increasing the modulus contrast also can reduce the resistance of the glass article to breakage caused by deep flaws. Without wishing to be bound by theory, it is believed that as the cladding modulus $E_{clad}$ increases and the modulus contrast $E_{core}-E_{clad}$ decreases, the strength of the glass article at flaw depths greater than the thickness of the cladding layers also increases because of the modulus effect. There are two competing mechanisms as the cladding modulus $E_{clad}$ increases. For stress-free cladding layers, increasing the cladding modulus $E_{clad}$ reduces the retained strength for flaws that extend beyond the cladding layers because the higher cladding modulus $E_{clad}$ applies a greater crack opening force to the crack tip, effectively pulling the crack open. As the influence of the compressive stress of the cladding layers increases, the residual stress effectively pulls the crack closed. The influence of the compressive stress increases as the cladding modulus $E_{clad}$ increases. The strength loss can be compensated by reducing the tension in the core layer (e.g., by reducing the CTE contrast and/or increasing the thickness of the core layer) and/or by increasing the thickness of the cladding layers. The improved short-flaw performance may enable products with lower compressive stress and higher depth of compressive layer compared to conventional strengthened glass articles, allowing for improved drop performance without sacrificing flexural strength.

In some embodiments, the modulus contrast can be tailored to form a glass article with a retained strength profile adapted for a particular application. For example, a likely flaw depth can be determined based on an intended use of the glass article, and the glass article can be formed with a modulus contrast that provides the greatest retained strength at the likely flaw depth. The likely flaw depth can represent the depth of flaws typically experienced by a glass article used in a particular application. For example, the likely flaw depth can be determined by empirical evidence gathered by examining one or more glass articles after use in the particular application.

In some embodiments, glass article 100 is chemically strengthened. For example, glass article 100 is subjected to an ion exchange treatment to increase the compressive stress in a region of the glass article near an outer surface of the glass article (e.g., an outer portion of first cladding layer 104 and/or second cladding layer 106). In some embodiments, the ion exchange treatment comprises applying an ion exchange medium to one or more surfaces of glass article 100. The ion exchange medium comprises a solution, a paste, a gel, a liquid, a vapor, a plasma, or another suitable medium comprising larger ions to be exchanged with smaller ions in the glass matrix (e.g., the glass matrix of first cladding layer 104 and/or the second cladding layer 106). The terms "larger ions" and "smaller ions" are relative terms, meaning that the larger ions are relatively large compared to the smaller ions and the smaller ions are relatively small compared to the larger ions. Thus, the larger ions have a larger ionic radius than the smaller ions, and the smaller ions have a smaller ionic radius than the larger ions. In some embodiments, first cladding layer 104 and/or second cladding layer 106 of glass article 100 comprise an alkali aluminosilicate glass. Thus, the smaller ions in the surface layer of glass article 100 and the larger ions in the ion exchange medium may be monovalent alkali metal cations (e.g., $Li^+$, $Na^+$, $K^+$, $Rb^+$, and/or $Cs^+$). Alternatively, monovalent cations in the surface layer of glass article 100 may be replaced with monovalent cations other than alkali metal cations (e.g., $Ag^+$ or the like). In some embodiments, first cladding layer 104 and/or second cladding layer 106 of glass article 100 comprise an alkaline earth aluminosilicate glass. Thus, the smaller ions in the surface layer of glass article 100 and the larger ions in the ion exchange medium may be divalent alkaline earth cations (e.g., $Be^{2+}$, $Mg^{2+}$, $Ca^{2+}$, $Sr^{2+}$, and/or $Ba^{2+}$). In some embodiments, the ion exchange medium comprises a molten salt solution, and the ion exchange treatment comprises immersing the laminated glass article in a molten salt bath comprising larger ions (e.g., $K^+$, $Na^+$, $Ba^{2+}$, $Sr^{2+}$, and/or $Ca^{2+}$) to be exchanged with smaller ions (e.g., $Na^+$, $Li^+$, $Ca^{2+}$, and/or $Mg^{2+}$) in the glass matrix. In some embodiments, the molten salt bath comprises a salt (e.g., a nitrate, a sulfate, and/or a chloride) of the larger ions. For example, the molten salt bath comprises molten $KNO_3$, molten $NaNO_3$, or a combination thereof. Additionally, or alternatively, the temperature of the molten salt bath is from about 380° C. to about 450° C., and an immersion time is from about 2 hours to about 16 hours.

By replacing smaller ions in the glass matrix with larger ions at the surface of glass article 100, compressive stress of first cladding layer 104 and/or second cladding layer 106 is increased or generated near the outer surface of the glass article. For example, during the ion exchange treatment, the larger ions from the ion exchange medium diffuse into an outer portion of first cladding layer 104 and/or second cladding layer 106 of glass article 100 and the smaller ions from the glass matrix diffuse out of the outer portion of the first cladding layer and/or second cladding layer of the glass article. Thus, the outer portion of first cladding layer 104 and/or second cladding layer 106 comprises an ion exchanged region of glass article 100. The increased concentration of the larger ions in the ion exchanged region causes crowding of the glass matrix and increases or generates the compressive stress of glass article 100 in the ion exchanged region.

In some embodiments, glass article is mechanically strengthened as described herein (e.g., the CTE of first cladding layer 104 and/or second cladding layer 106 is lower than the CTE of core layer 102). In such embodiments, subjecting glass article 100 to the ion exchange treatment increases a surface compressive stress at the outer surface of the glass article (e.g., from an initial surface compressive stress generated by the CTE mismatch) to a final compressive stress value. For example, the final compressive stress value is at least about 200 MPa, at least about 300 MPa, at least about 400 MPa, at least about 500 MPa, at least about 600 MPa, at least about 700 MPa, at least about 800 MPa, at least about 900 MPa, or at least about 1000 MPa. Additionally, or alternatively, the final compressive stress value is at most about 1300 MPa, at most about 1200 MPa, at most about 1100 MPa, at most about 1000 MPa, at most about 900 MPa, or at most about 800 MPa.

Figure 6:
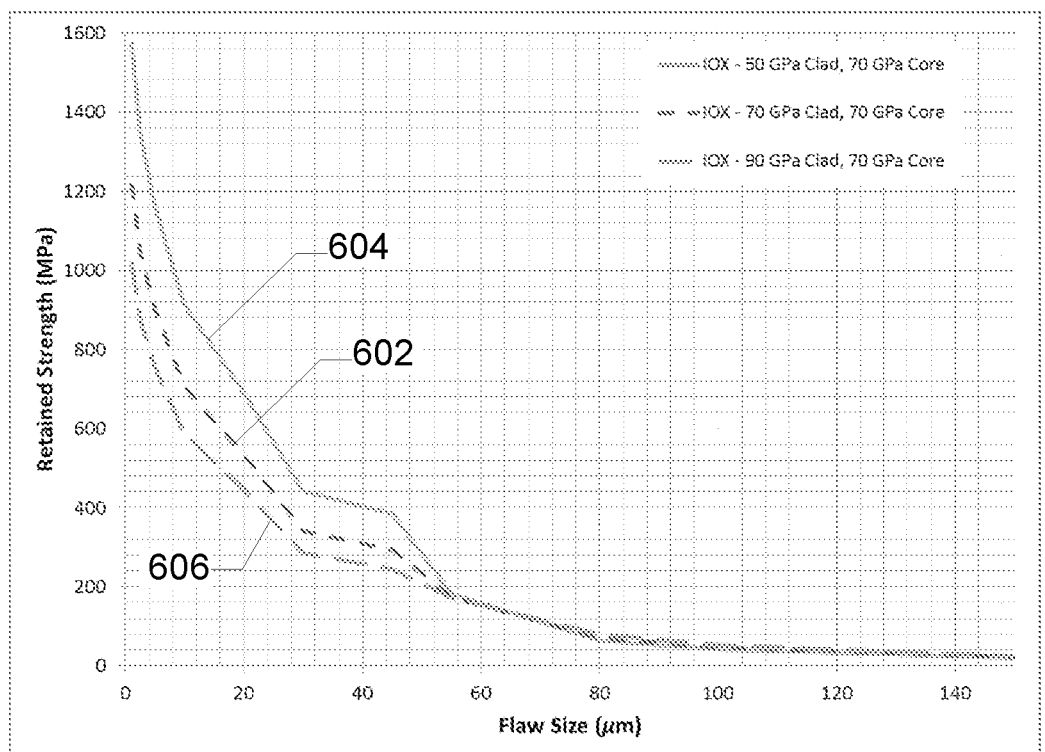
FIG. 6 is a graphical illustration comparing retained strength profiles of exemplary glass articles with different modulus contrasts and strengthened by a combination of mechanical and chemical strengthening.

FIG. 6 is a graphical illustration comparing exemplary retained strength profiles of glass articles with different modulus contrasts and strengthened by a combination of mechanical and chemical strengthening. The retained strength profiles shown in FIG. 6 were generated using fracture mechanics simulations. The simulated glass article was a laminated glass sheet as described with reference to FIGS. 3-4 except that the mechanically strengthened glass article was subjected to an ion exchange treatment to generate an ion exchanged region in the cladding layers and increase the surface compressive stress of the glass article. The ion exchanged region extended from an outer surface of the glass article to a depth of 25 μm. The surface compressive stress was 900 MPa. The compressive stress in the cladding layers decreased with increasing depth from the outer surface in an error function profile throughout the ion exchanged region to a compressive stress of 190 MPa at an inner surface of the ion exchanged region. The compressive stress was substantially constant at 190 MPa throughout a remainder of the cladding layer between the ion exchanged region and the core layer (e.g., the non-ion exchanged region of the cladding layer). The core layer was under a tensile stress of 21 MPa. The tensile stress was substantially constant throughout the core layer. To generate the retained strength profiles shown in FIG. 6, the cladding modulus $E_{clad}$ was varied from 50 GPa to 90 GPa while holding the core modulus $E_{core}$ constant at 70 GPa. The simulated glass article resulting in retained strength profile 602 had a cladding modulus $E_{clad}$ of 70 GPa, for a modulus contrast $E_{core}-E_{clad}$ of 0 GPa (i.e., no modulus contrast). The simulated glass article resulting in retained strength profile 604 had a cladding modulus $E_{clad}$ of 50 GPa, for a modulus contrast $E_{core}-E_{clad}$ of 20 GPa and a modulus ratio $E_{core}/E_{clad}$ of 1.4. The simulated glass article resulting in retained strength profile 606 had a cladding modulus $E_{clad}$ of 90 GPa, for a modulus contrast $E_{core}-E_{clad}$ of -20 GPa and a modulus ratio $E_{core}/E_{clad}$ of 0.78. Retained strength profile 602 represents a control example in which the glass article is free of a modulus contrast (i.e., $E_{core}=E_{clad}$). Retained strength profiles 604 represents an exemplary embodiment in which $E_{core}>E_{clad}$. Retained strength profile 606 represents a comparative example in which $E_{core}<E_{clad}$.

As shown in FIG. 6, retained strength profile 604 has a retained strength of about 910 MPa at a flaw depth of 10 μm compared to retained strength profile 602 that has a retained strength of about 705 MPa at a flaw depth of 10 μm. Thus, increasing the modulus contrast from 0 GPa to 20 GPa increases the retained strength of the glass article by about 29%. The increase in retained strength results from the increased modulus contrast, without any change in the compressive stress in the cladding layers or the tensile stress in the core layer. Thus, the modulus contrast can enable increased retained strength for the same degree of combined mechanical and chemical strengthening (e.g., the same CTE contrast, thicknesses, and ion exchange treatment).

As shown in FIG. 6, retained strength profile 606 has a retained strength of about 590 MPa at a flaw depth of 10 μm compared to retained strength profile 602 that has a retained strength of about 700 MPa at a flaw depth of 10 μm. Thus, decreasing the modulus contrast from 0 GPa to -20 GPa decreases the retained strength of the glass article by about 16%. Thus, decreasing the modulus contrast from 0 GPa to -40 GPa decreases the retained strength of the glass article by about 33%. The decreases in retained strength result from the decreased modulus contrast, without any change in the compressive stress in the cladding layers or the tensile stress in the core layer.

In some embodiments, glass article 100 is not mechanically strengthened. For example, in some embodiments, the CTE of first cladding layer 104 and/or second cladding layer 106 is equal to the CTE of core layer 102. In such embodiments, there is little or no stress in first cladding layer 104 and/or second cladding layer 106 prior to any ion exchange treatment, and subjecting glass article 100 to the ion exchange treatment generates a surface compressive stress at the outer surface of the glass article. For example, the surface compressive stress value is at least about 200 MPa, at least about 300 MPa, at least about 400 MPa, at least about 500 MPa, at least about 600 MPa, at least about 700 MPa, at least about 800 MPa, at least about 900 MPa, or at least about 1000 MPa. Additionally, or alternatively, the surface compressive stress value is at most about 1300 MPa, at most about 1200 MPa, at most about 1100 MPa, at most about 1000 MPa, at most about 900 MPa, or at most about 800 MPa. In other embodiments, the CTE of first cladding layer 104 and/or second cladding layer 106 is greater than the CTE of core layer 102. In such embodiments, first cladding layer 104 and/or second cladding layer 106 are in tension prior to any ion exchange treatment, and subjecting glass article 100 to the ion exchange treatment reduces a surface tensile stress and/or generates a surface compressive stress at the outer surface of the glass article. For example, the surface compressive stress value is at least 0 MPa, at least about 20 MPa, at least about 50 MPa, at least about 100 MPa, at least about 200 MPa, at least about 300 MPa, at least about 400 MPa, at least about 500 MPa, or at least about 600 MPa. Additionally, or alternatively, the surface compressive stress value is at most about 1000 MPa, at most about 800 MPa, at most about 600 MPa, at most about 400 MPa, at most about 200 MPa, or at most about 100 MPa.

In various embodiments, first cladding layer 104 and/or second cladding layer 106 comprise or are formed from a relatively low modulus glass composition, and core layer 102 comprises or is formed from a relatively high modulus glass composition such that glass article 100 comprises a modulus contrast and/or modulus ratio as described herein. Although exemplary pairs of glass compositions are described herein, such examples are not limiting, and other glass compositions can be used to achieve the properties described herein. In some embodiments, first cladding layer 104 and/or second cladding layer 106 comprise or are formed from a relatively low CTE glass composition, and core layer 102 comprises or is formed from a relatively high CTE glass composition such that glass article is mechanically strengthened as described herein. Additionally, or alternatively, first cladding layer 104 and/or second cladding layer 106 comprise or are formed from an ion exchangeable glass composition such that glass article can be chemically strengthened as described herein.

The glass articles described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In various embodiments, a consumer electronic device (e.g., smartphones, tablet computers, personal computers, ultrabooks, televisions, and cameras), an architectural glass, and/or an automotive glass comprises a glass article as described herein.

EXAMPLES

Various embodiments will be further clarified by the following examples.

Exemplary laminated glass sheets have the general structure shown in FIG. 1 and the properties given in Table 1 in which Core Glass represents the glass composition of the core layer, Clad Glass represents the glass composition of the first and second cladding layers, $E_{core}-E_{clad}$ represents the modulus contrast of the laminated glass sheet, $E_{core}-E_{clad}$ represents the modulus ratio of the laminated glass sheet, and $CTE_{core}-CTE_{clad}$ represents the CTE contrast of the laminated glass sheet.

Glass Composition A is a glass composition produced under the name Corning® Pyrex® 7070 Lithia Potash Borosilicate Glass from Corning Incorporated and has a modulus of 51 GPa and a CTE of $32 \times 10^{-7}$ °C.$^{-1}$.

Glass Composition B is a glass composition produced under the name Corning® Pyrex® 7740 Borosilicate Glass from Corning Incorporated and has a modulus of 62.75 GPa and a CTE of $32.5 \times 10^{-7}$ °C.$^{-1}$.

Glass Composition C is an ion exchangeable glass composition produced under the name Corning® Gorilla® Glass 4 from Corning Incorporated and has a modulus of 65.8 GPa and a CTE of $86.9 \times 10^{-7}$ °C.$^{-1}$.

Glass composition D is an alkaline earth boroaluminosilicate glass composition produced under the name Corning® Eagle$^{2000}$® Glass from Corning Incorporated and has a modulus of 70.9 GPa and a CTE of $31.8 \times 10^{-7}$ °C.$^{-1}$.

Glass composition E is an ion exchangeable, aluminosilicate glass composition produced under the name Corning® Code 1737 from Corning Incorporated and has a modulus of 70.9 GPa and a CTE of $37.6 \times 10^{-7}$ °C.$^{-1}$.

Glass composition F is an ion exchangeable, aluminosilicate glass composition produced under the name Corning® Code 0317 from Corning Incorporated and has a modulus of 71.71 GPa and a CTE of $88 \times 10^{-7}$ °C.$^{-1}$.

Glass composition G is an ion exchangeable, aluminosilicate glass composition produced under the name Corning® Gorilla® Glass from Corning Incorporated and has a modulus of 73.3 GPa and a CTE of $91 \times 10^{-7}$ °C.$^{-1}$.

Glass composition H is an alkaline earth boroaluminosilicate glass composition produced under the name Corning® Eagle XG™ Glass from Corning Incorporated and has a modulus of 73.6 GPa and a CTE of $31.7 \times 10^{-7}$ °C.$^{-1}$.

Glass composition I is a glass composition produced under the name Corning® Lotus™ NXT from Corning Incorporated and has a modulus of 83 GPa and a CTE of $35 \times 10^{-7}$ °C.$^{-1}$.

Glass Composition J comprises 62.33 wt % $SiO_2$, 22.55 wt % $Al_2O_3$, 4.75 wt % $B_2O_3$, 0.95 wt % $Li_2$, 9.28 wt % MgO, 0.09 wt % CaO, 0.04 wt % $Fe_2O_3$, and 0.02 wt % $TiO_2$; and has a modulus of 90.2 GPa and a CTE of $36 \times 10^{7}$ °C.$^{-1}$.

TABLE 1

Properties of Exemplary Laminated Glass Sheets

| Example | Core Glass | Clad Glass | $E_{core} - E_{clad}$ (GPa) | $E_{core}/E_{clad}$ | $CTE_{core} - CTE_{clad}$ ($\times 10^{-7}$ c.$^{-1}$) |
|---|---|---|---|---|---|
| 1 | F | C | 5.91 | 1.09 | 1.1 |
| 2 | J | I | 7.2 | 1.09 | 1 |
| 3 | G | C | 7.5 | 1.11 | 4.1 |
| 4 | D | B | 8.15 | 1.13 | -0.7 |
| 5 | E | B | 8.15 | 1.13 | 5.1 |
| 6 | F | B | 8.96 | 1.14 | 55.5 |
| 7 | I | H | 9.4 | 1.13 | 3.3 |
| 8 | G | B | 10.55 | 1.17 | 58.5 |
| 9 | H | B | 10.85 | 1.17 | -0.8 |
| 10 | B | A | 11.75 | 1.23 | 0.5 |
| 11 | I | D | 12.1 | 1.17 | 3.2 |
| 12 | I | E | 12.1 | 1.17 | -2.6 |
| 13 | C | A | 14.8 | 1.29 | 54.9 |
| 14 | J | H | 16.6 | 1.23 | 4.3 |
| 15 | J | D | 19.3 | 1.27 | 4.2 |
| 16 | J | E | 19.3 | 1.27 | -1.6 |
| 17 | D | A | 19.9 | 1.39 | -0.2 |
| 18 | E | A | 19.9 | 1.39 | 5.6 |
| 19 | I | B | 20.25 | 1.32 | 2.5 |
| 20 | F | A | 20.71 | 1.4 | 56 |
| 21 | G | A | 22.3 | 1.44 | 59 |
| 22 | H | A | 22.6 | 1.44 | -0.3 |
| 23 | J | B | 27.45 | 1.44 | 3.5 |
| 24 | I | A | 32 | 1.63 | 3 |
| 25 | J | A | 39.2 | 1.77 | 4 |

The laminated glass sheets of examples 1-3, 5-8, 10-11, 13-15, 18-21 and 23-25 comprise a positive CTE contrast (i.e., $CTE_{core} > CTE_{clad}$), whereby the laminated glass sheet is mechanically strengthened as described herein, and the cladding layers are in compression. Among those examples, the laminated glass sheets of examples 1 and 3 comprise cladding layers formed from an ion exchangeable clad glass composition, whereby the laminated glass sheet can be chemically strengthened as described herein to form an ion exchanged region at one or both outer surfaces and further increase the surface compressive stress of the laminated glass sheet.

The laminated glass sheets of examples 4, 9, 12, 16-17, and 22 comprise a negative CTE contrast (i.e., $CTE_{core} < CTE_{clad}$), whereby the cladding layers are in tension as described herein. However, the laminated glass sheets of examples 12 and 16 comprise cladding layers formed from an ion exchangeable clad glass composition, whereby the laminated glass sheet can be chemically strengthened as described herein to form an ion exchanged region at one or both outer surfaces and generate a surface compressive stress. After such chemical strengthening, outer portions of the cladding layers (e.g., ion exchanged regions of the cladding layers) are in compression, inner portions of the cladding layers (e.g., non-ion exchanged regions of the cladding layers) are in tension, and the core layer is in compression.

The glass compositions A-J can be used in combinations other than those described with respect to the laminated glass articles of examples 1-25. The laminated glass articles of examples 1-25 are exemplary, and other glass compositions may be used in laminated glass articles having one or more of the features described herein.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A laminated glass article comprising:
   a glass core layer comprising a core modulus $E_{core}$; and
   a glass cladding layer adjacent to the core layer and comprising a cladding modulus $E_{clad}$ that is at least 5 GPa less than $E_{core}$;
   wherein the glass cladding layer comprises an alkali aluminosilicate glass and wherein:
   the core layer comprises a core coefficient of thermal expansion $CTE_{core}$; and the cladding layer comprises a cladding coefficient of thermal expansion $CTE_{clad}$ that is greater than or equal to $CTE_{core}$.

2. The laminated glass article of claim 1, wherein the core layer comprises a liquidus viscosity of at least about 30 kP.

3. The laminated glass article of claim 1, wherein a difference between $CTE_{core}$ and $CTE_{clad}$ is at most $60 \times 10^{-7}$/° C.

4. The laminated glass article of claim 1, wherein a difference between $CTE_{core}$ and $CTE_{clad}$ is greater than or equal to $-1 \times 10^{-7}$/° C.

5. The laminated glass article of claim 1, wherein $E_{core}/E_{clad}$ is at least 1.08.

6. The laminated glass article of claim 1, wherein $E_{clad}$ is at least 12 GPa less than $E_{core}$.

7. The laminated glass article of claim 1, comprising an estimated retained strength with a 10 μm deep flaw formed therein of at least about 10% greater than a reference glass article comprising a reference core modulus and a reference cladding modulus that are equal to one another.

8. The laminated glass article of claim 1, wherein the cladding layer comprises a compressive stress resulting at least in part from subjecting the laminated glass article to an ion exchange treatment to form an ion exchanged region at an outer surface of the cladding layer.

9. The laminated glass article of claim 1, wherein the cladding layer comprises a first cladding layer and a second cladding layer, and the core layer is disposed between the first cladding layer and the second cladding layer.

10. The laminated glass article of claim 1, wherein $1.08 \leq E_{core}/E_{clad} \leq 1.77$.

11. A laminated glass article according to claim 1, wherein a modulus ratio $E_{core}/E_{clad}$ of at least 1.08; and
an estimated retained strength with a 10 μm deep flaw formed therein of at least about 10% greater than a reference glass article comprising a reference core modulus and a reference cladding modulus that are equal to one another.

12. The laminated glass article of claim 11, further comprising a modulus contrast $E_{core}-E_{clad}$ of at least 12 GPa.

13. The laminated glass article of claim 11, wherein the core layer comprises a liquidus viscosity of at least about 30 kP.

14. The laminated glass article of claim 11, wherein $E_{core}/E_{clad}$ is at least 1.18.

15. The laminated glass article of claim 11, wherein the cladding layer comprises a compressive stress resulting at least in part from subjecting the laminated glass article to an ion exchange treatment to form an ion exchanged region at an outer surface of the cladding layer.

16. A consumer electronic device, an architectural glass, or an automotive glass comprising the laminated glass article of claim 1.

17. A method comprising:
contacting a molten core glass with a molten clad glass to form a laminated glass article comprising a glass core layer and a glass cladding layer, the glass core layer comprising a core modulus $E_{core}$, and the glass cladding layer comprising a cladding modulus $E_{clad}$; and
subjecting the laminated glass article to an ion exchange treatment to generate or increase a surface compressive stress of the laminated glass article, wherein
the cladding modulus $E_{clad}$ is at least 5 GPa less than $E_{core}$, and wherein the glass cladding layer comprises an alkali aluminosilicate glass and wherein:
the core layer comprises a core coefficient of thermal expansion $CTE_{core}$; and the cladding layer comprises a cladding coefficient of thermal expansion $CTE_{clad}$ that is greater than or equal to $CTE_{core}$.

18. The method according to claim 17, wherein comprising:
the laminated glass article comprises a modulus ratio $E_{core}/E_{clad}$ of at least 1.08.

* * * * *